(12) United States Patent
Häder et al.

(10) Patent No.: US 6,802,644 B2
(45) Date of Patent: Oct. 12, 2004

(54) INTERNAL MIXER WITH BEARING HOUSINGS HAVING A DIRT PARTICLE OUTLET

(75) Inventors: Walter Häder, Modling (AT); Andreas Limper, Freudenberg (DE)

(73) Assignee: ThyssenKrupp Elastomertechnik GmbH, Freudenberg (DE)

( * ) Notice: Subject to any disclaimer, the term of this patent is extended or adjusted under 35 U.S.C. 154(b) by 120 days.

(21) Appl. No.: 10/321,620

(22) Filed: Dec. 18, 2002

(65) Prior Publication Data

US 2003/0112699 A1 Jun. 19, 2003

(30) Foreign Application Priority Data

Dec. 18, 2001 (DE) .......................................... 101 61 779

(51) Int. Cl.[7] .............................................. B01F 15/00
(52) U.S. Cl. ...................................... 366/331; 366/76.7
(58) Field of Search ......................... 366/64, 66, 76.7, 366/76.8, 83–85, 96–99, 297–301, 331; 384/624

(56) References Cited

U.S. PATENT DOCUMENTS

| | | | | | |
|---|---|---|---|---|---|
| 1,773,367 | A | * | 8/1930 | Lewis | ........................ 366/76.7 |
| 2,495,242 | A | * | 1/1950 | Jones | ......................... 366/300 |
| 2,753,161 | A | * | 7/1956 | Fye | .............................. 366/331 |
| 3,057,008 | A | * | 10/1962 | Kurt et al. | ................... 366/76.7 |
| 3,921,962 | A | * | 11/1975 | Feger et al. | ................. 366/331 |
| 3,949,972 | A | | 4/1976 | Bell et al. | |
| 4,606,647 | A | * | 8/1986 | Frye | ........................... 366/331 |
| 4,775,240 | A | * | 10/1988 | Passoni | ....................... 366/301 |
| 4,850,723 | A | * | 7/1989 | Whiteman, Jr. | .............. 384/477 |
| 5,056,800 | A | * | 10/1991 | Becker | ........................ 277/429 |
| 5,277,489 | A | * | 1/1994 | Hamm | ........................ 366/331 |
| 5,531,079 | A | * | 7/1996 | Tatematsu et al. | ........... 384/624 |

FOREIGN PATENT DOCUMENTS

| | | |
|---|---|---|
| DE | 2616551 A1 | 10/1987 |
| DE | 197 25 937 A1 | 12/1998 |
| DE | 39 05 708 C2 | 8/1999 |
| DE | 198 19 740 A1 | 11/1999 |
| DE | 198 19 741 A1 | 11/1999 |
| FR | 2814514 A1 * | 3/2004 |
| JP | 1-215509 * | 8/1989 |
| JP | 10-109025 * | 4/1998 |
| JP | 2000-283297 * | 10/2000 |
| WO | 94/25147 * | 11/1994 |

* cited by examiner

*Primary Examiner*—Charles E. Cooley
(74) *Attorney, Agent, or Firm*—Browdy and Neimark, P.L.L.C.

(57) ABSTRACT

In an internal mixer, the bearing housings of the bearing arrangements for the journals of the rotors are mounted directly on the end walls of the housing. The gaps which are formed between the rotor and the end wall and between the journal and the end wall are connected to the outside by way of outlets. These outlets bridge the bearing which is encapsulated in the bearing housing.

12 Claims, 8 Drawing Sheets

INTERNAL MIXER WITH BEARING HOUSINGS HAVING A DIRT PARTICLE OUTLET

BACKGROUND OF THE INVENTION

1. Field of the Invention

The invention relates to an internal mixer, comprising a housing, which encloses a mixing chamber, and which has end walls facing each other; at least one rotor, which is disposed in the mixing chamber, which has mixing devices, which defines a gap towards the end wall, and which has journals that pass through the end walls out of the mixing chamber, forming an annular gap that is connected to the gap; and bearing arrangements, which are disposed outside the mixing chamber, which have a bearing housing, and in each of which a journal is run on a bearing.

2. Background Art

Internal mixers of the generic type have been disclosed by prior public use; they comprise bearing blocks which are separate from the housing of the internal mixer and spaced from the end walls of the housing. Disposed between the journals of the shaft and the end walls are seals in the form of stuffing box packings or the like. Internal mixers of the generic type primarily serve to knead rubber together with carbon black and other fillers and loading agents. In particular particles of carbon black will exit as dirt through the seals. These dirt particles can be impasted and agglutinated in the vicinity of the seal by the supply of oil or other suitable bonding agents. A drawback of this familiar design resides in that the bearings are comparatively remote from the housing, which renders the rotors comparatively long. This leads to unfavorable elastic curves of the rotors on the one hand and to an increase in diameter and weight of the rotors on the other, requiring greater stability of the bearings. Furthermore, cleaning between the bearing blocks and the seals is rather complicated, the bearing blocks being not sufficiently remote from the end walls for easy access to the interstice and the sealing area.

SUMMARY OF THE INVENTION

It is an object of the invention to embody the internal mixer of the generic type in such a way that bedding the rotors is simplified and sealing is improved.

According to the invention, this object is attained by the features which consist in that the bearing housings are disposed on the end walls; and in that allocated to each bearing housing is at least one dirt-particle outlet which is connected to the annular gap and bridges the bearing. These measures ensure that no bearing blocks which are separate from the housing are necessary, but that the bearing housings are mounted directly on the respective end wall. This leads to a reduction in length of the rotors, in particular of the journals of the shaft, and thus to improvement of the elastic curve of the rotors. The diameter of the rotors can be reduced. Any complicated jobs of cleaning between the bearing block and the end wall or the seal can be dropped, because the dirt particles are removed outwards past the bearing.

Further features, advantages and details of the invention will become apparent from the ensuing description of three exemplary embodiments, taken in conjunction with the drawing.

DESCRIPTION OF THE PREFERRED EMBODIMENTS

Figure 1:
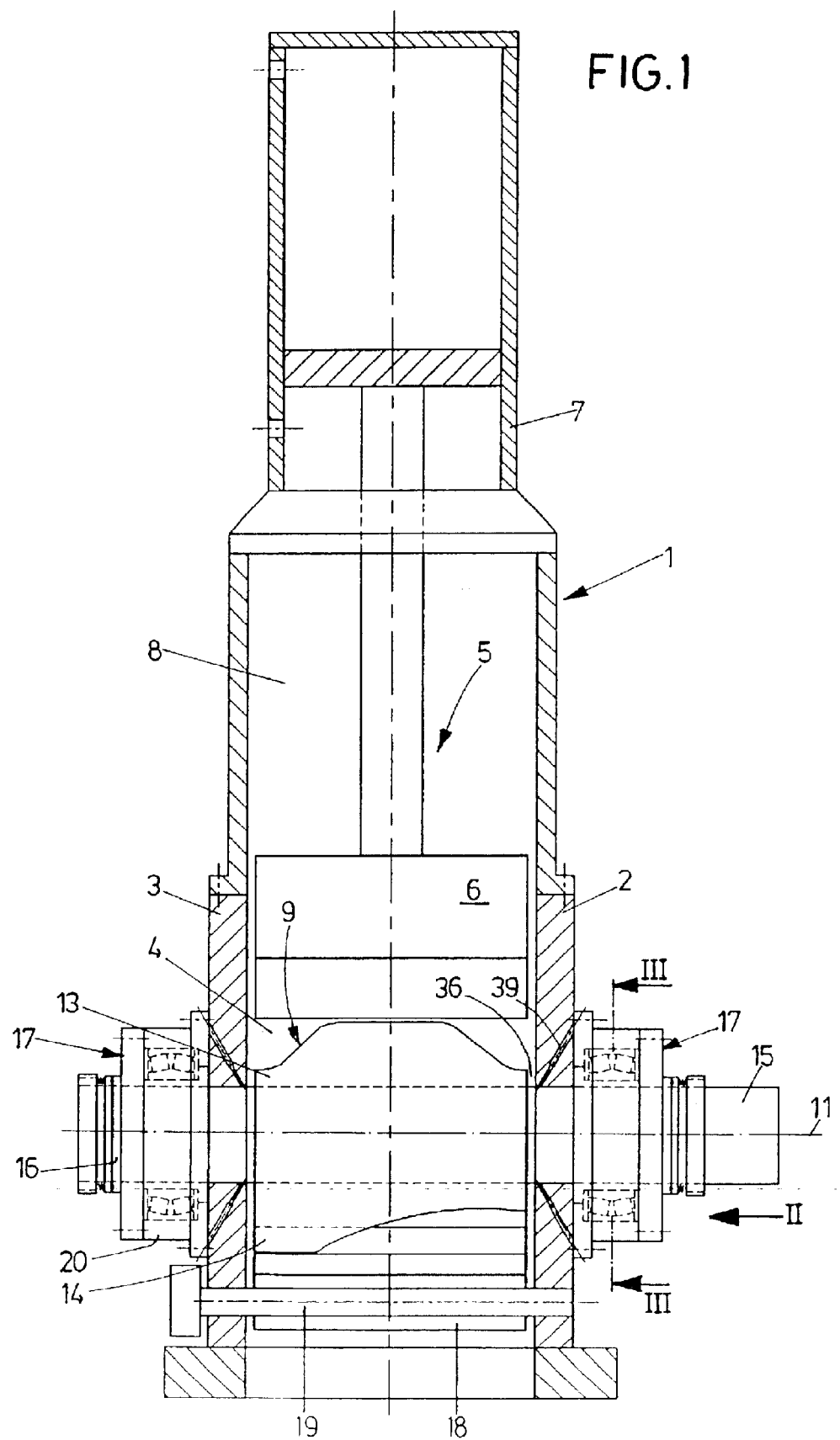
FIG. 1 is a vertical sectional view of an internal mixer.
Figure 2:
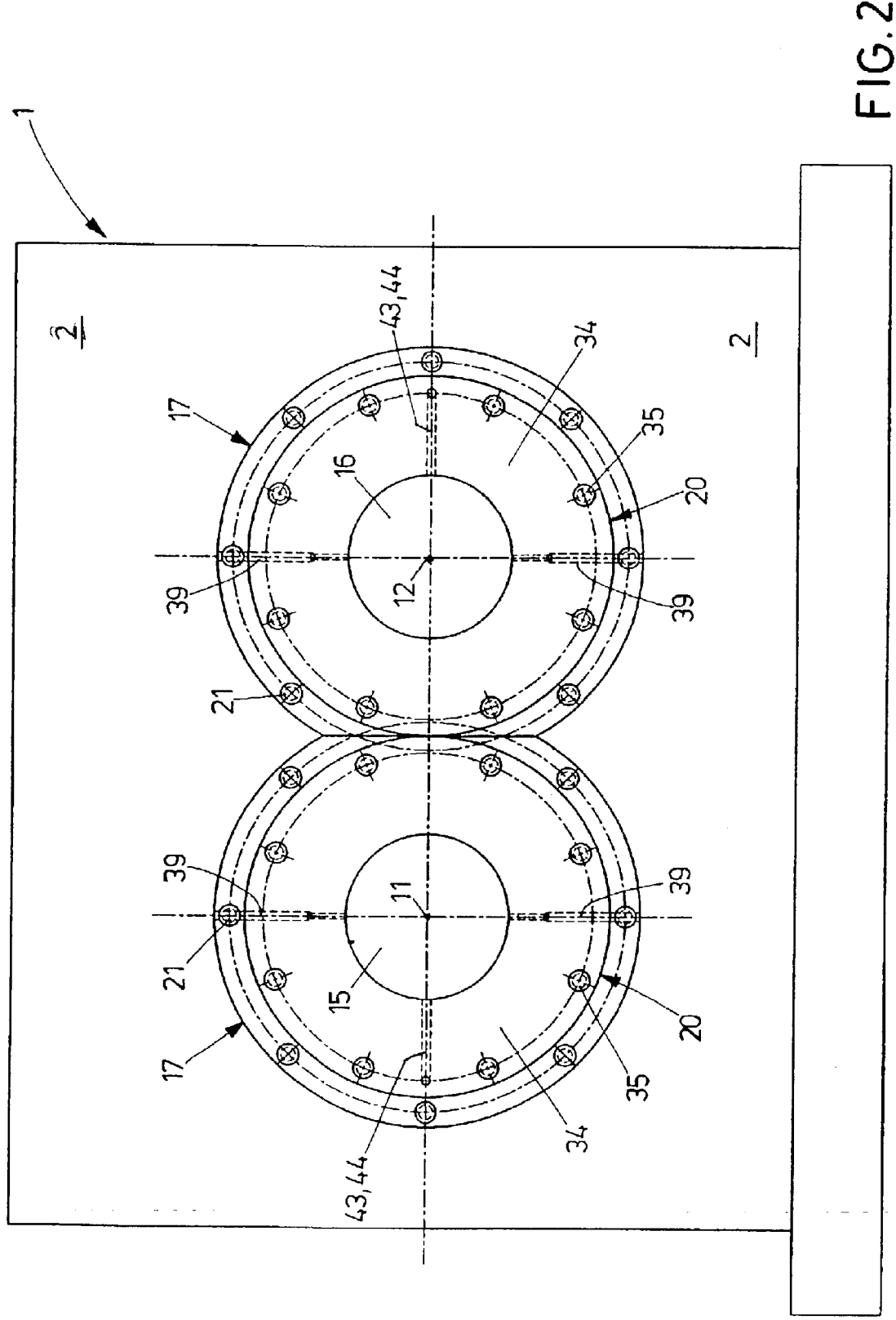
FIG. 2 is an elevation of a part of the internal mixer in accordance with the arrow II of FIG. 1.
Figure 3:
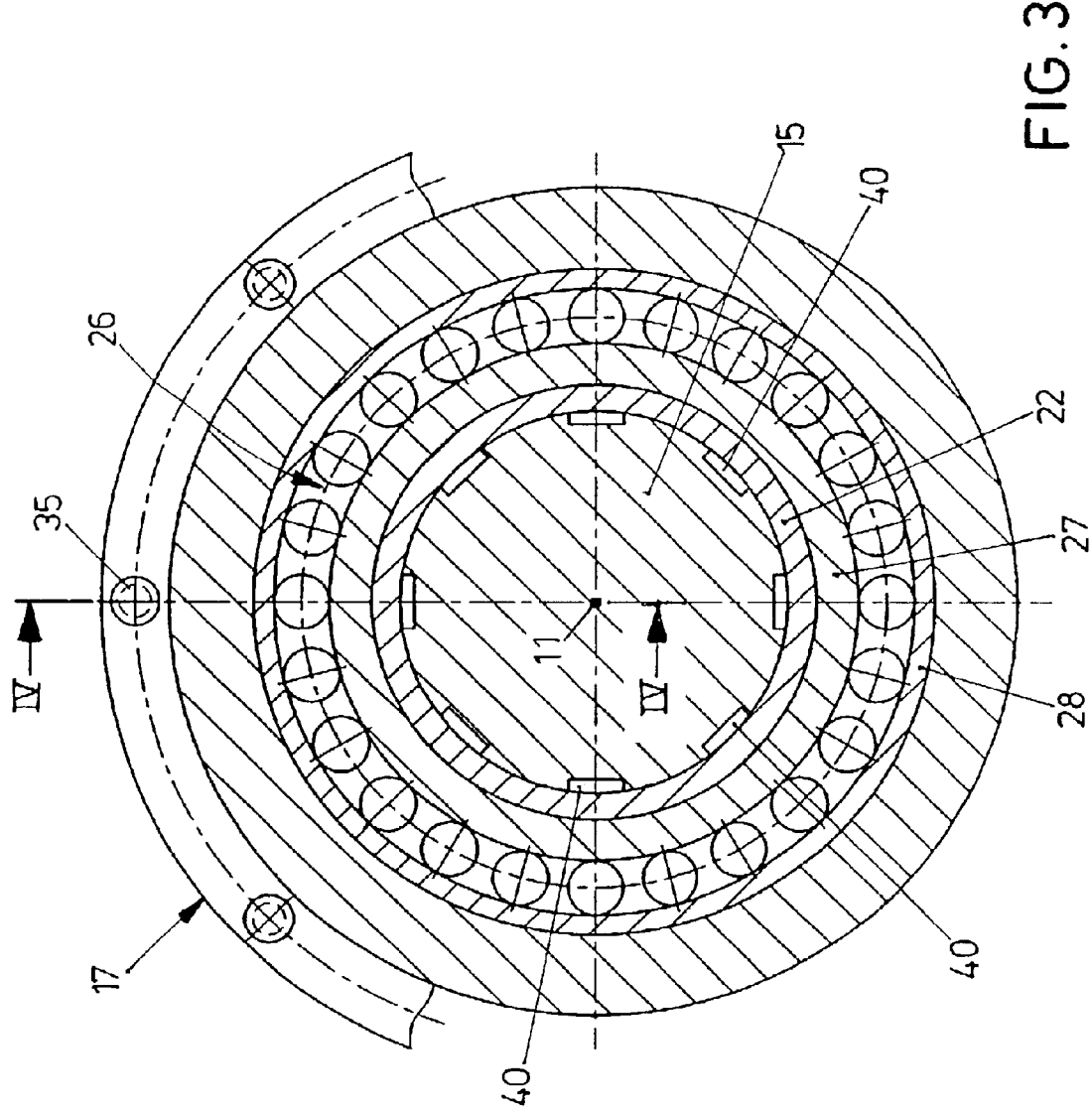
FIG. 3 is a vertical cross-sectional view of a first embodiment of a bearing of the internal mixer on the line III—III of FIG. 1.
Figure 4:
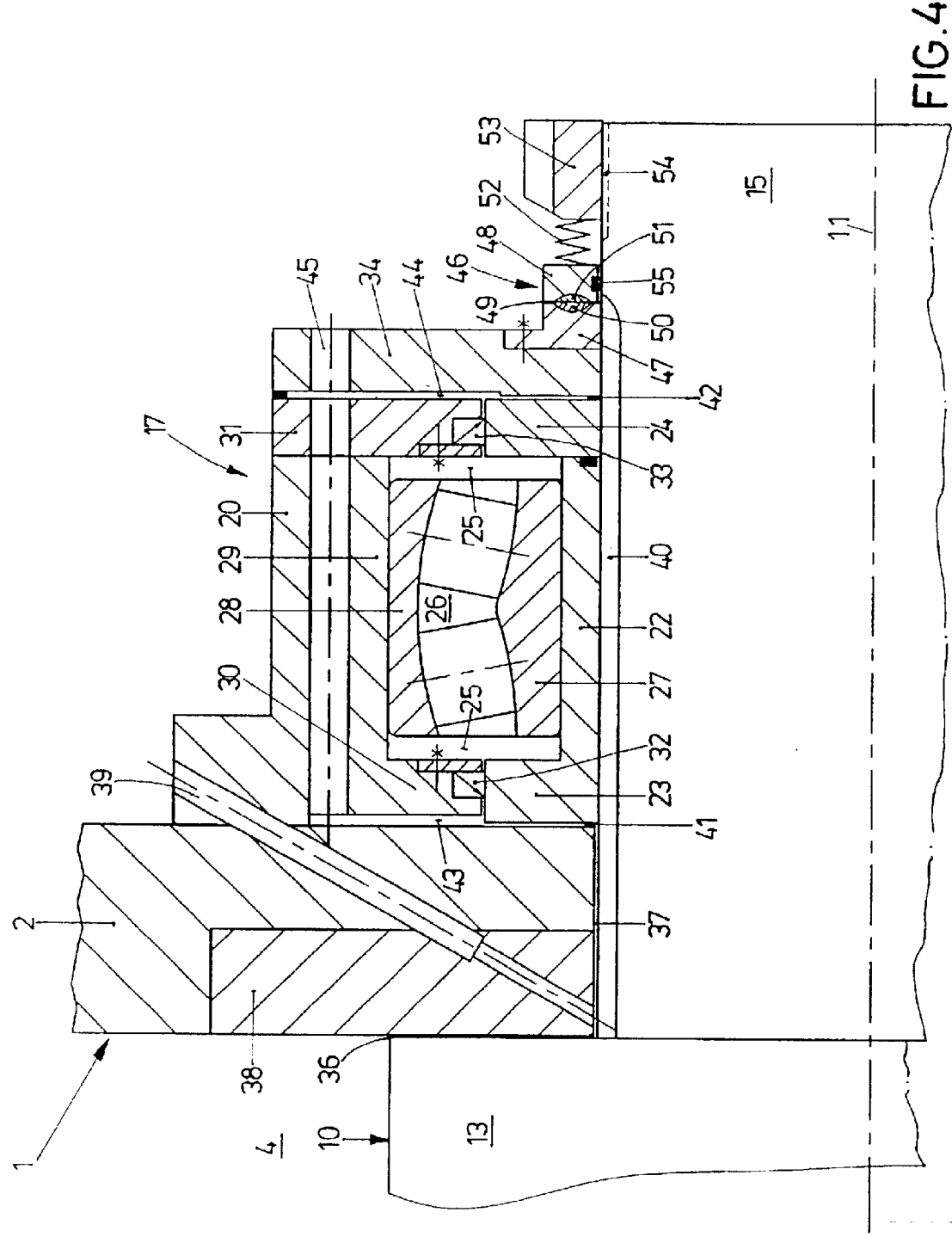
FIG. 4 is a partial longitudinal sectional view of the bearing on the line IV—IV of FIG. 3.

The internal mixer seen in FIG. 1 comprises a housing 1 with end walls 2, 3 and a stuffing device 5 disposed above a mixing chamber 4 which is enclosed by the housing 1. This stuffing device 5 includes a stuffer 6, which is turned towards the mixing chamber 4 and which is movable vertically towards, and away from, the mixing chamber 4 by means of a hydraulically actuated piston-cylinder drive 7 which is mounted on the housing 1. The stuffer 6 defines the mixing chamber 4 upwards. Above the mixing chamber 4, and in the way of the stuffer 6, provision is made for an inlet 8 for material that is to be worked, as rule rubber.

Two rotors 9, 10 with parallel axes 11, 12 that run on a common horizontal plane are disposed in the mixing chamber 4. The rotors 9, 10 (of which only the rotor 9 is seen in FIG. 1) have cylindrical rotor bodies 13 in the mixing chamber 4; mixing blades 14, which serve as a mixing device, are attached to the rotor bodies 13. The mixing blades 14 of the two rotors 9, 10 intermesh. On each rotor body 13, which leads approximately as far as to the end wall 2, 3, journals 15, 16 are formed coaxially with the axes 11, 12; the journals 15, 16 are rotatably mounted in bearing arrangements 17 which are disposed outside the end walls 2, 3. Four bearing arrangements 17 of fundamentally identical design are provided on each internal mixer. Via the journals 15, 16, the rotors 9, 10 are operated by a driving motor (not shown) by way of a branching gearing (not shown). An outlet flap 18, which is pivotal about an axis 19, is disposed underneath the mixing chamber 4. The internal mixer so far described has been widespread standard practice for quite a while and is generally known under the designation "Werner & Pfleiderer mixer".

In the embodiment according to FIGS. 1 to 4, the bearing arrangements 17 have bearing housings 20 which are fixed by screws 21 directly to the respective end wall 2 and 3. The bearing arrangements 17 are identical in design, only one of them being described in the following.

A bearing bush 22 is mounted non-rotatably on the respective journal 15, having an annular flange 23 on the side turned towards the respective end wall 2. Disposed on the end of the bearing bush 22 that faces away from the annular flange 23 is a flange ring 24 which also bears against the bearing bush 22 and is also non-rotatably mounted on the journal 15. The bearing housing 20 has a recess 25, which is defined towards the journal 15 by the bearing bush 22 together with the annular flange 22 and the flange ring 24; disposed in the recess 25 is an antifriction bearing 26, the inner ring 27 of which supports itself on the bearing bush 22 while the outer ring 28 thereof supports itself on the inside wall 29 of the bearing housing 20. The recess 25 of the bearing housing 20 is defined by a ring land 30 on the side adjacent the end wall 2, and by a cover ring 31 on the outward side. Disposed on the ring land 30 and on the cover ring 31 are seals 32, 33 which bear sealingly against the annular flange 23 and the flange ring 24 and which protect the recess 25 from any foreign substances penetrating, thus correspondingly protecting the antifriction bearing 26. The antifriction bearing 26 is consequently encapsulated. A cover 34 bears from outside against the bearing housing 20; it also bears against the cover ring 31. It is joined to the bearing housing 20 by screws 35 which also pass through the cover ring 31.

No seal is provided between the end wall 2 and the journal 15. Between the rotor body 13 and the end wall 2, provision is made for a gap 36 in the shape of an annular disk, which is conditioned by construction, operation and manufacturing requirements. Due to the so-called "Weissenberg effect" as a law of physics, dirt in the form of fine particles of the worked material i.e., in the form of fine particles of rubber, carbon black and other fillers, will migrate through this gap 36 to the journal 15, and from there outwards through an annular gap 37 in the shape of a cylindrical ring which is also conditioned by construction, operation and manufacturing requirements. The width of the gaps 36, 37 ranges from 1 mm to 2 mm. For wear between the end wall 2 and the rotor body 13 to be avoided, a wearing disk 38 may be inserted into the end wall 2 in this area.

Several measures have been taken for discharging the mentioned dirt particles while bypassing the antifriction bearing 26.

One or several admission channels 39 pass from outside through the bearing housing 20, the end wall 2 and the wearing disk 38 and terminate in the annular gap 37 in the shape of a cylindrical ring in proximity to the rotor body 13. Oil is supplied through these admission channels 39, by which to impaste the dirt particles that have arrived in the annular gap 37 in the way described. The paste is discharged outwards through outlets 40 within the bearing housing 20 and within the bearing bush 22, the outlets 40 being provided in the form of longitudinal grooves in the respective journal 15; discharge is effected among others by the pressure that acts from the mixing chamber 4 via the disk-shaped gap 36 towards the journal 15. Since, conditioned by construction, operation and manufacturing requirements, a disk-shaped annular gap 41 and 42, respectively, exists between the annular flange 23, the bearing bush 22 and the end wall 2 on the one hand and the flange ring 24 and the cover 34 on the other, the impasted dirt particles will inevitably penetrate into these annular gaps 41, 42 which are open towards the outlets 40. So as to prevent even minor quantities of these impasted dirt particles from passing by the seals 32, 33 and reaching the antifriction bearing 26, radial discharge channels 43, 44, which may be grooves or drilled holes, are provided subsequently to the annular gaps 41, 42. These discharge channels 43, 44 mouth into an outlet 45 which leads outwards through the cover 34.

The outlets 40 discharge into a seal and outlet arrangement 46. According to FIG. 4, this arrangement 46 comprises a closing ring 47 which is joined to the cover 34 i.e., it is stationary towards the bearing housing 20, and to which is allocated a counterpart closing ring 48 which is non-rotatable in relation to the journal 15. The joint 49 between both rings 47, 48 includes seals 50, 51 of highly wear-resistant material, for example hard metal. The counterpart closing ring 48, together with the seal 51 lodged therein, is pressed against the closing ring 47 by means of a pre-loaded compression spring 52 as an energy storing device so that the seals 50, 51 bear sealingly, but rotatably against one another. The compression spring 52 supports itself on an abutment 53, which is for instance a nut that is screwed on a thread 54 on the end of the journal 15. Corresponding rotation of the nut and thus of the abutment 53 regulates the pre-load of the compression spring 52 and thus the pressure by which the seals 50, 51 bear against each other.

As mentioned, the dirt particles migrate through the outlets 40. If the pressure in the vicinity of the seals 50, 51 is sufficiently high, the impasted dirt is discharged and catapulted outwards in the form of droplets through the joint 49 i.e., outwards between the seals 50, 51.

The counterpart closing ring 48 is of course sealed towards the journal 15 by means of a seal 55.

Figure 5:
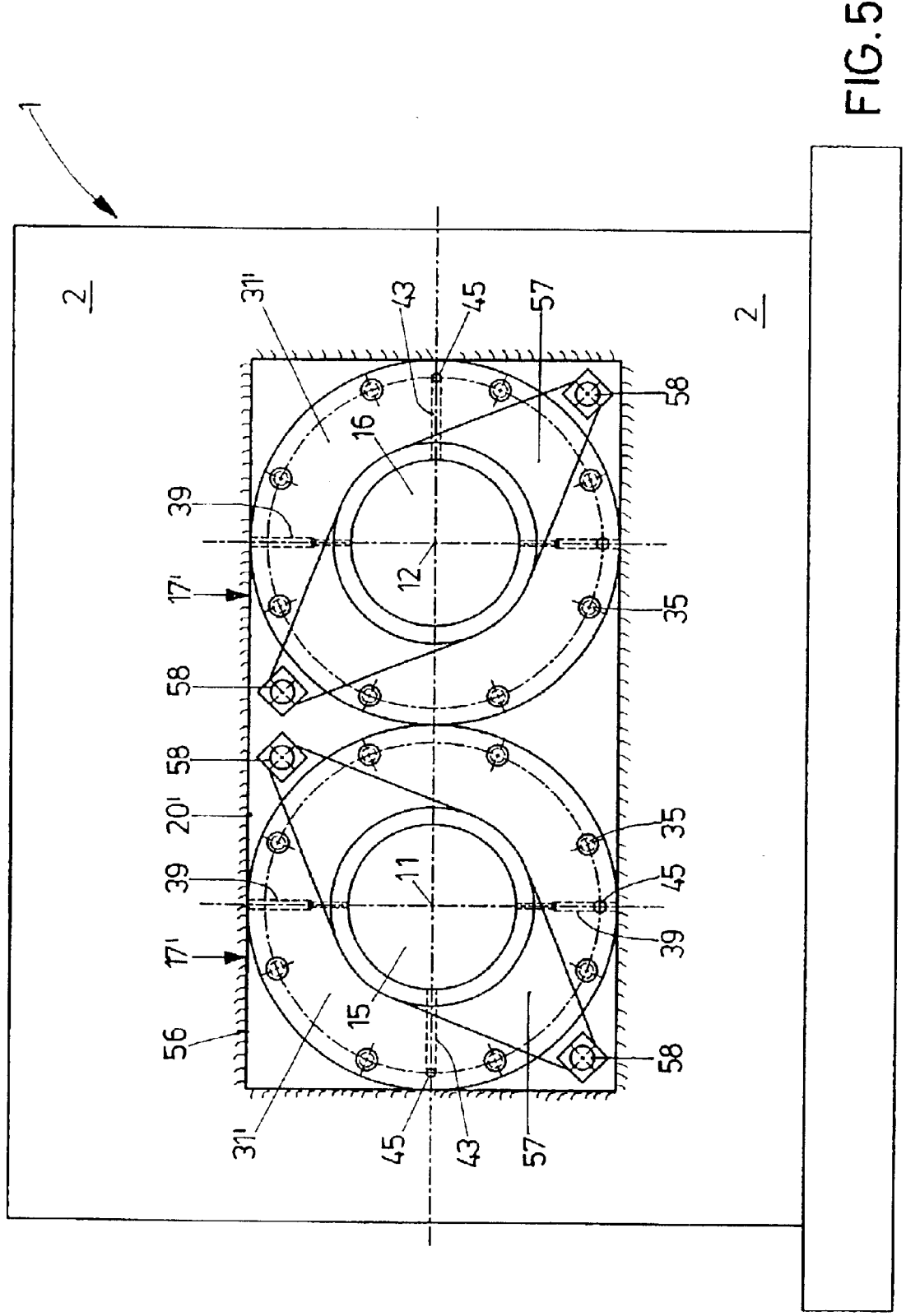
FIG. 5 is an elevation of a second embodiment of a bearing.
Figure 6:
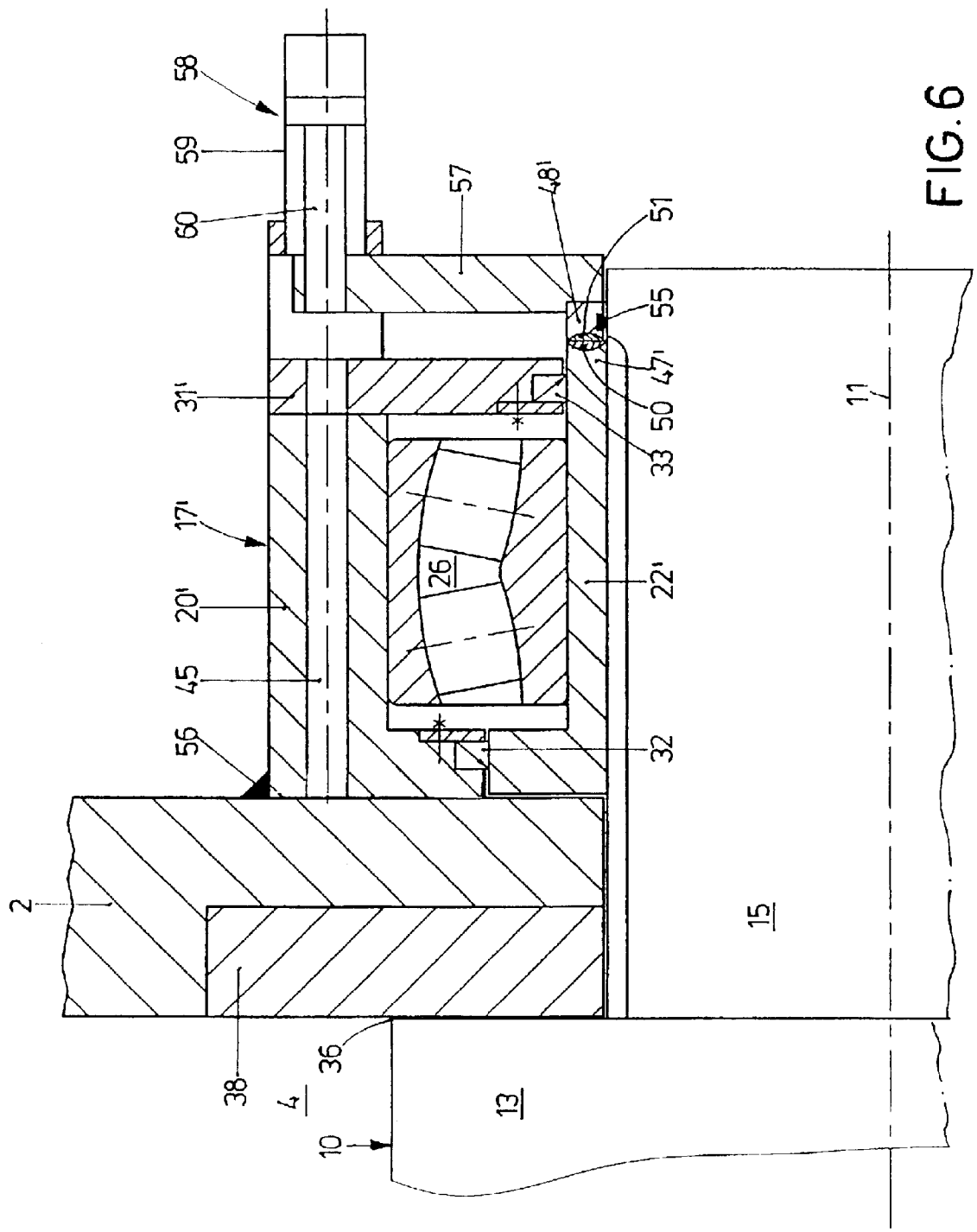
FIG. 6 is a partial longitudinal sectional view of the bearing of the second embodiment.

The second embodiment according to FIGS. 5 and 6 substantially differs from the above embodiment by the means that press the seal 51 against the seal 50. Identical components have the same reference numerals and parts which are functionally identical, but slightly differ in construction have the same reference numerals as in the above first embodiment, however provided with a prime, there being no need of renewed description.

In this second embodiment, a common bearing housing 20', which is fixed to the end wall 2 by a weld 56, is provided for the bearing arrangements 17' which are mounted on an end wall 2. In this case, the bearing bush 22' is passed outwards in the vicinity of the journal 15 by a cover ring 31' which forms a cover; it simultaneously constitutes the closing ring 47' in this area. A press plate 57 bears against the counterpart closing ring 48', forcing the seals 50, 51 together by means of two hydraulically actuated piston-cylinder drives 58 that serve as energy storing devices. The cylinder 59 of the respective drive 58 is joined to the bearing housing 20', while the piston rod 60 of the drive 58 is joined to the press plate 57. The compression forces exercised on the seals 50, 51 by the drives 58 that serve as energy storage devices, can be affected, and thus regulated, by the pressure of the hydraulic fluid.

Figure 7:
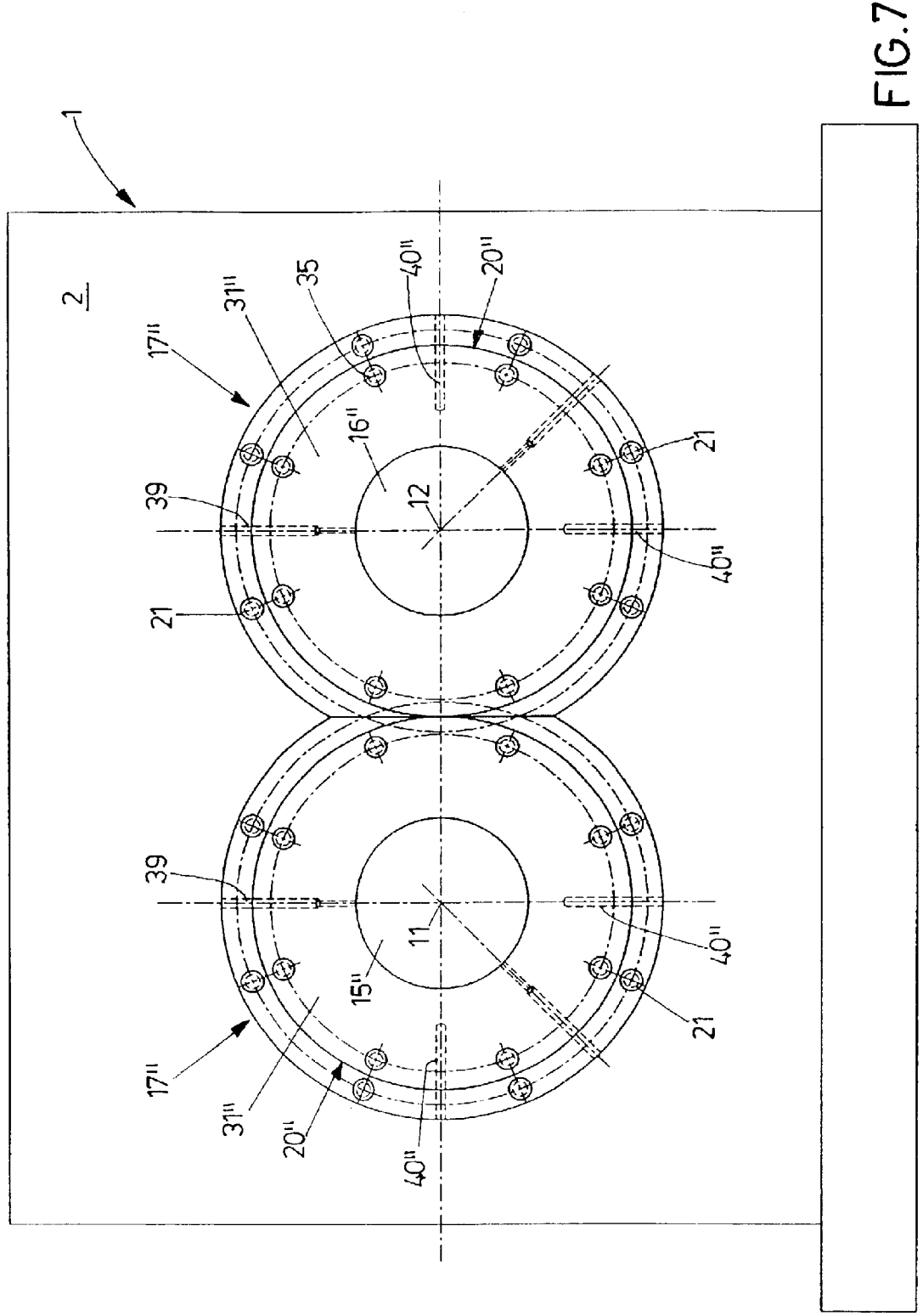
FIG. 7 is a plan view, corresponding to FIG. 2, of a third embodiment of a bearing.
Figure 8:
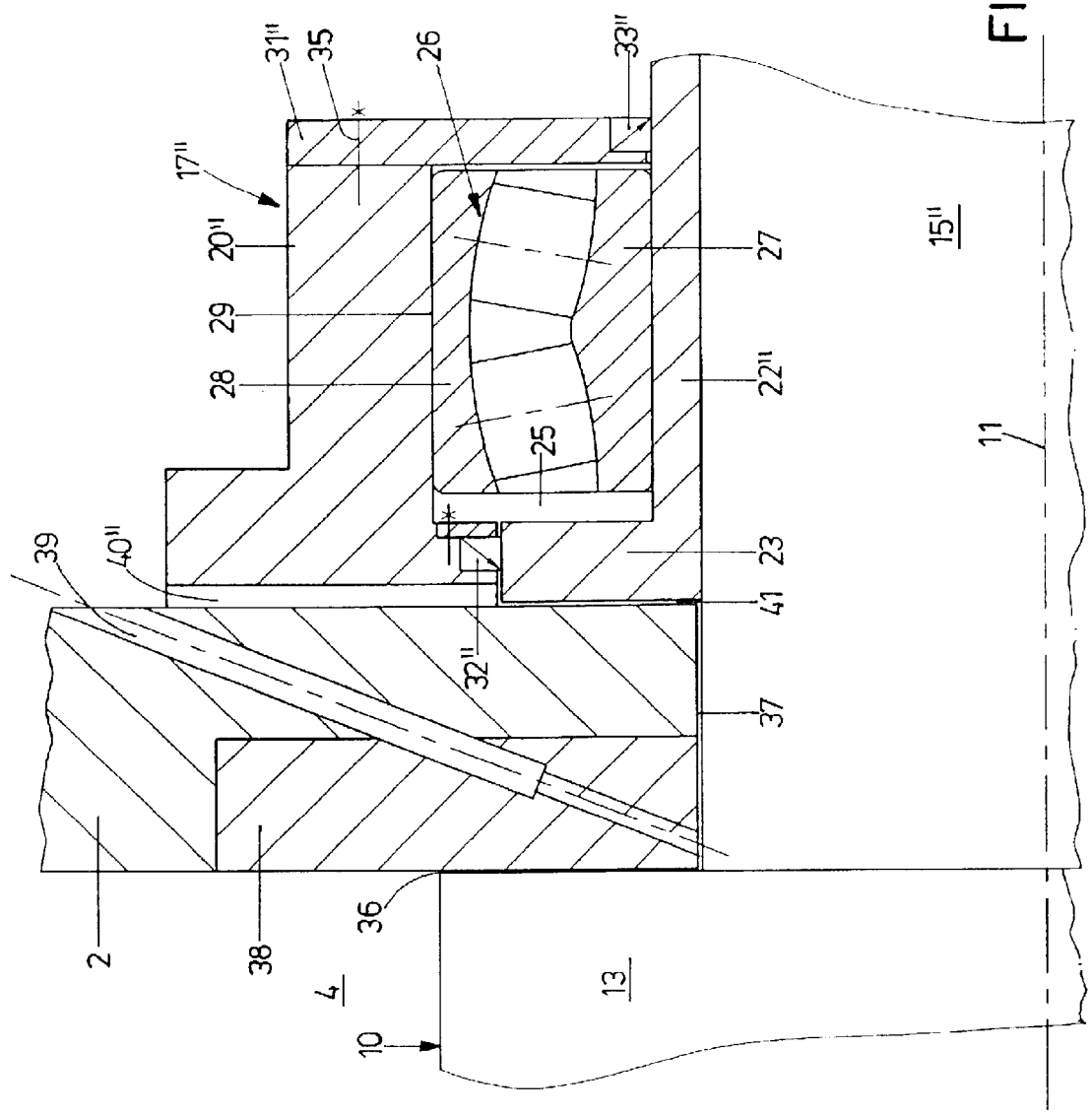
FIG. 8 is a partial longitudinal sectional view of the bearing of the third embodiment.

The third embodiment according to FIGS. 7 and 8 substantially differs from the first embodiment according to FIGS. 1 to 4 by the measures taken for discharging the impasted particles past the bearing 26. Identical parts have the same reference numerals and parts that are functionally identical, but slightly differ in construction have the same reference numerals as in the first embodiment, however provided with a double prime, there being no need of renewed description.

In this third embodiment, no outlets in the form of longitudinal grooves are provided in the journal 15". Discharging the impasted particles that leave the gap 37 in the shape of a cylindrical ring takes place solely through the disk-shaped annular gap 41 between the annular flange 23 of the bearing bush 22" and the end wall 2 of the housing 1. The discharge channel that extends radially of the axis 11 also serves as an outlet 40". The cover ring 31" simultaneously serves as a cover and closes the recess 25 of the bearing housing 20". This recess 25, which accommodates the antifriction bearing 26, is completely sealed by means of the seals 32", 33", as seen in FIG. 8.

What is claimed is:

1. An internal mixer, comprising
a housing (1),
which encloses a mixing chamber (4), and
which has end walls (2, 3) facing each other;

at least one rotor (9, 10),
   which is disposed in the mixing chamber (4),
   which has mixing devices,
   which defines a gap (36) towards the end wall (2, 3), and
   which has journals (15, 16, 15") that pass through the end walls (2, 3) out of the mixing chamber (4), forming an annular gap (37) that is connected to the gap (36); and bearing arrangements (17),
   which are disposed outside the mixing chamber (4),
   which have a bearing housing (20, 20', 20"), and
   in each of which a journal (15, 16, 15") is run on a bearing (26);

wherein the bearing housings (20, 20', 20") are disposed on the end walls (2, 3); and wherein allocated to each bearing housing (20, 20', 20") is at least one dirt-particle outlet (40, 40") which is connected to the annular gap (37) and bridges the bearing (26).

2. An internal mixer according to claim 1, wherein the bearing (26) is provided in an encapsulation in the bearing housing (20, 20', 20").

3. An internal mixer according to claim 2, wherein, in the bearing housing (20, 20'), provision is made for at least one discharge channel (43, 44), which leads outwards and encircles the encapsulation of the bearing (26) and is connected to the at least one outlet (40).

4. An internal mixer according to claim 2, wherein the at least one outlet (40") leads radially outwards between the housing (1) and the encapsulation of the bearing (26).

5. An internal mixer according to claim 1, wherein a lubricant admission channel (39) opens into the annular gap (37).

6. An internal mixer according to claim 1, wherein, on an end of the bearing housing (20, 20') that faces away from the end wall (2, 3), provision is made for a seal and outlet arrangement (46) which acts between the bearing housing (20, 20') and the journal (15, 16) and into which terminates at least one outlet (40).

7. An internal mixer according to claim 6, wherein the seal and outlet arrangement (46) comprises two seals (50, 51) which are rotatable one relative to the other and define a joint (49) which is connected to the at least one outlet (40).

8. An internal mixer according to claim 7, wherein the two seals (50, 51) are pressed against one another by at least one energy storage device.

9. An internal mixer according to claim 8, wherein the force exercised by the at least one energy storage device is adjustable.

10. An internal mixer according to claim 8, wherein the at least one energy storage device is a pre-loaded compression spring (52).

11. An internal mixer according to claim 8, wherein the at least one energy storage device is a hydraulic-fluid-actuated piston-cylinder drive (58).

12. An internal mixer according to claim 1, wherein several outlets (40) are provided, which are formed by grooves in the journal (15, 16) of the at least one rotor (10).

* * * * *